United States Patent
McMahon et al.

(10) Patent No.: US 9,115,669 B2
(45) Date of Patent: Aug. 25, 2015

(54) GAS TURBINE ENGINE EXHAUST NOZZLE COOLING VALVE

(75) Inventors: Shawn M. McMahon, Pittsfield, MA (US); Russell P. Parrish, Wethersfield, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 886 days.

(21) Appl. No.: 13/284,041

(22) Filed: Oct. 28, 2011

(65) Prior Publication Data

US 2013/0104557 A1 May 2, 2013

(51) Int. Cl.
| | |
|---|---|
| *F02K 1/08* | (2006.01) |
| *F02K 1/38* | (2006.01) |
| *F02K 1/28* | (2006.01) |
| *F02K 1/82* | (2006.01) |
| *F01D 25/08* | (2006.01) |
| *F01D 25/14* | (2006.01) |
| *F01D 17/10* | (2006.01) |
| *F02C 7/18* | (2006.01) |
| *F02K 1/09* | (2006.01) |

(52) U.S. Cl.
CPC .............. *F02K 1/825* (2013.01); *F01D 17/10* (2013.01); *F01D 25/08* (2013.01); *F01D 25/14* (2013.01); *F02C 7/18* (2013.01); *F02K 1/08* (2013.01); *F02K 1/28* (2013.01); *F02K 1/38* (2013.01); *F02K 1/09* (2013.01); *Y02T 50/675* (2013.01)

(58) Field of Classification Search
CPC .............. F02K 1/08; F02K 1/38; F02K 1/06; F02K 1/09; F02K 1/383; F02K 1/28; F02C 7/18

USPC ........ 60/39.23, 231, 232, 770, 771, 761, 762, 60/766, 226.3; 239/265.17, 127.3; 137/625.3

See application file for complete search history.

(56) References Cited

U.S. PATENT DOCUMENTS

| | | | | |
|---|---|---|---|---|
| 2,837,893 | A | | 6/1958 | Schirmer |
| 3,386,658 | A | * | 6/1968 | Mehr ........................ 239/127.3 |
| 3,765,171 | A | * | 10/1973 | Hagen et al. ................ 60/39.23 |
| 3,821,968 | A | * | 7/1974 | Barb ......................... 137/625.3 |
| 4,041,982 | A | * | 8/1977 | Lindner ..................... 137/625.3 |
| 4,375,821 | A | * | 3/1983 | Nanao .......................... 137/239 |
| 4,617,963 | A | * | 10/1986 | Stares ....................... 137/625.3 |
| 4,944,149 | A | * | 7/1990 | Kuwata ...................... 60/39.23 |
| 5,427,147 | A | * | 6/1995 | Henriksson ............... 137/625.3 |
| 5,694,767 | A | * | 12/1997 | Vdoviak et al. ............. 60/226.3 |
| 6,418,709 | B1 | | 7/2002 | Narcus et al. |
| 6,425,240 | B1 | * | 7/2002 | Park ........................... 60/39.23 |
| 6,505,646 | B1 | * | 1/2003 | Singleton .................. 137/625.3 |
| 8,393,355 | B2 | * | 3/2013 | Samy ........................ 137/625.3 |
| 8,490,651 | B2 | * | 7/2013 | Cheng et al. .............. 137/625.3 |
| 8,739,548 | B2 | * | 6/2014 | Petty ............................ 60/771 |
| 2002/0017327 | A1 | * | 2/2002 | Kawaai et al. ............ 137/625.3 |
| 2009/0158703 | A1 | * | 6/2009 | Petty ............................ 60/230 |
| 2009/0241550 | A1 | | 10/2009 | Petty et al. |
| 2009/0255269 | A1 | | 10/2009 | Petty et al. |
| 2010/0043393 | A1 | * | 2/2010 | Zamora et al. ............. 60/226.3 |
| 2010/0218509 | A1 | | 9/2010 | Milner |

* cited by examiner

*Primary Examiner* — William H Rodriguez
(74) *Attorney, Agent, or Firm* — Carlson, Gaskey & Olds, P.C.

(57) ABSTRACT

A cooling system for a gas turbine engine includes a first structure movable relative to a second structure. The first structure has a cavity. A valve selectively controls fluid flow from a cooling source to the cavity. A valve is configured to move between first and second fluid flow positions in response to movement of the first structure. The first fluid flow position provides a greater amount of cooling fluid from the cooling source to the cavity than in the second fluid flow position.

6 Claims, 4 Drawing Sheets

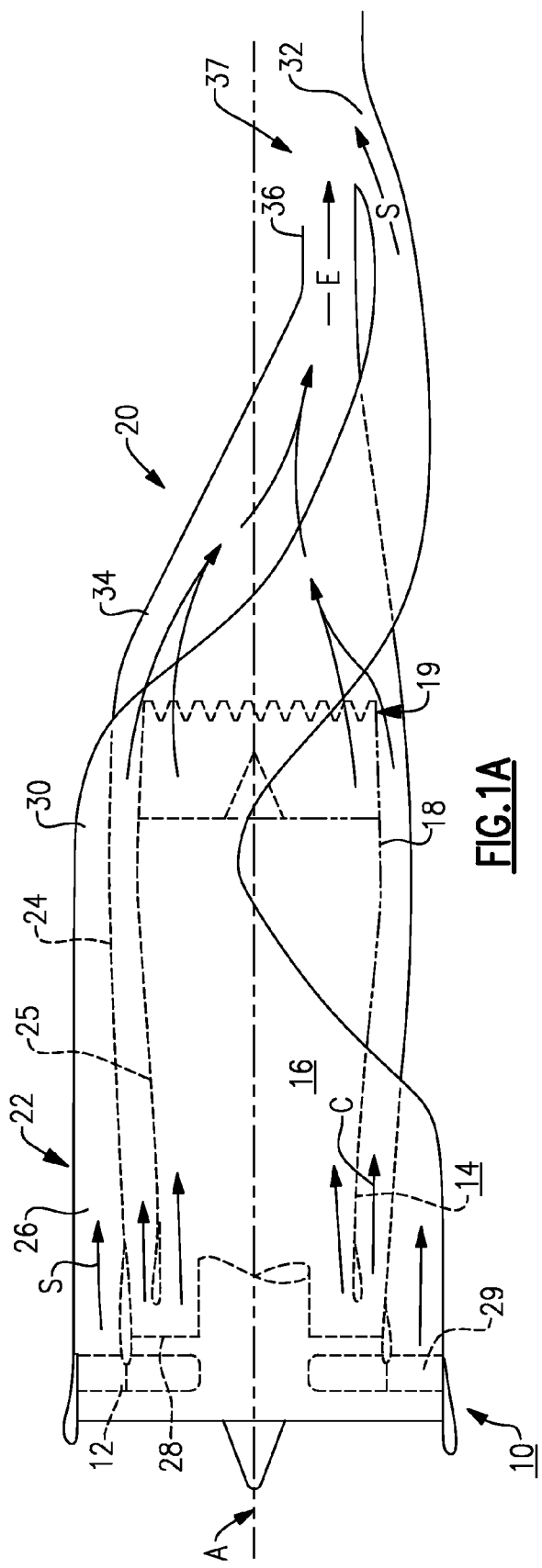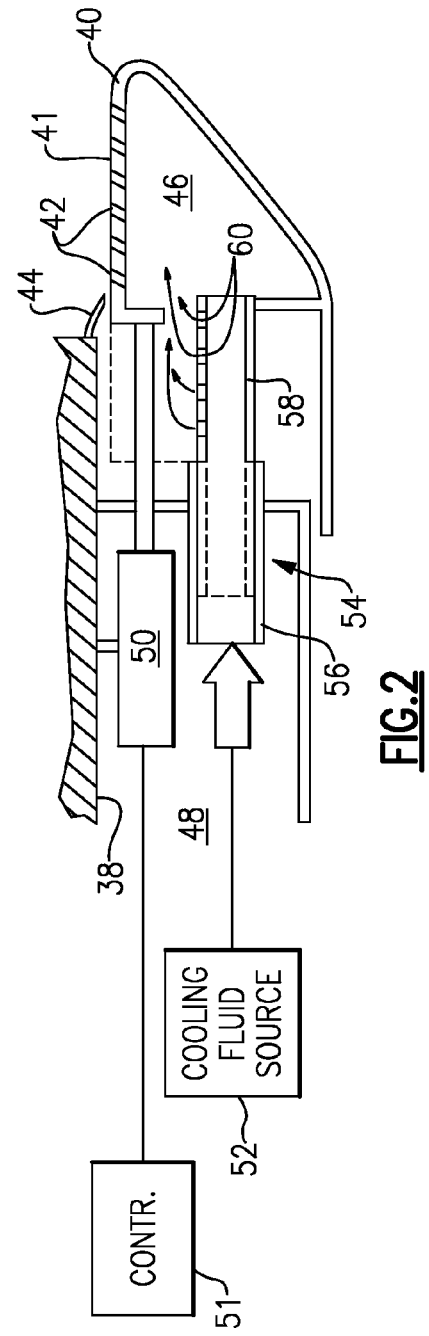

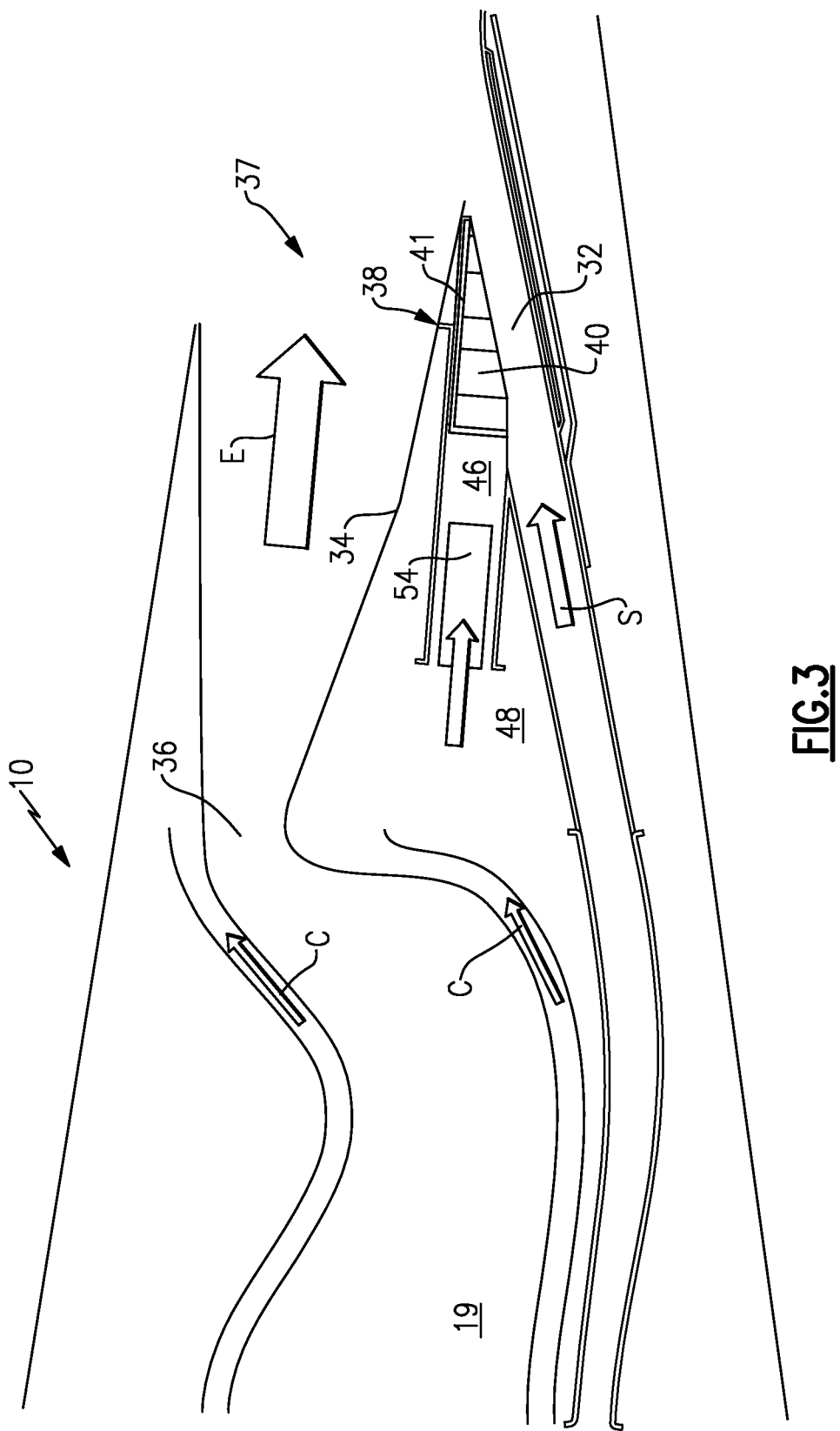

GAS TURBINE ENGINE EXHAUST NOZZLE COOLING VALVE

BACKGROUND

This disclosure relates to a cooling system for a gas turbine engine, and in particular, a method of cooling the gas turbine engine component using a valve.

Variable cycle engines power high performance aircraft over a range of operating conditions yet achieve countervailing objectives such as high specific thrust and low fuel consumption. A variable cycle engine essentially alters the engine bypass ratio during flight to facilitate efficient performance over a broad range of altitude and flight velocity such as to generate high thrust for maneuver and optimized fuel efficiency for loiter.

Variable cycle engines typically include a variable exhaust nozzle system which operates over a wide range of pressure ratios by adjustment of a nozzle throat based on the demands of the engine cycle, and may include provision for adjustment of a nozzle area ratio to facilitate desired engine performance at various operating points.

One example of a variable cycle engine and exhaust uses three flow streams, exhausting through two nozzles. The low pressure compressor stream and core stream exhaust through the primary nozzle. The fan stream exits the variable secondary nozzle. Varying the secondary nozzle alters thrust at the nozzle exit. Also varying the secondary nozzle exit area affects the overall engine cycle by directing of flow into or diverting away from the primary flow path by varying third stream back pressure, thus effectively altering the bypass ratio.

The variable cycle engine may include a structure that translates to selectively block the secondary nozzle. The translating structure provides a liner that is selectively exposed to the hot exhaust stream. If an augmenter is used, cooling of the liner becomes of greater importance. Typically, the liner is supplied a continuous supply of cooling fluid regardless of the translational position of the liner.

SUMMARY

A cooling system for a gas turbine engine includes a first structure movable relative to a second structure. The first structure has a cavity. A valve selectively controls fluid flow from a cooling source to the cavity. A valve is configured to move between first and second fluid flow positions in response to movement of the first structure. The first fluid flow position provides a greater amount of cooling fluid from the cooling source to the cavity than in the second fluid flow position.

A method of cooling a structure includes providing a first structure in a first position relative to a second structure. The first structure includes a cavity. Cooling fluid flows at a first flow rate to the cavity in the first position. The second structure is moved to a second position relative to the second structure. A valve is manipulated in response to movement by the first structure to supply cooling fluid to the cavity at a second flow rate that is different than the first flow rate.

BRIEF DESCRIPTION OF THE DRAWINGS

The disclosure can be further understood by reference to the following detailed description when considered in connection with the accompanying drawings wherein:

FIG. 1A is a general sectional view an exemplary gas turbine engine embodiment for use with the disclosed valve.

FIG. 2 is a schematic view of a translating structure relative to a fixed structure with the disclosed valve.

FIG. 3 illustrates the translating structure relative to primary and secondary nozzles.

DETAILED DESCRIPTION

Figure 1B:
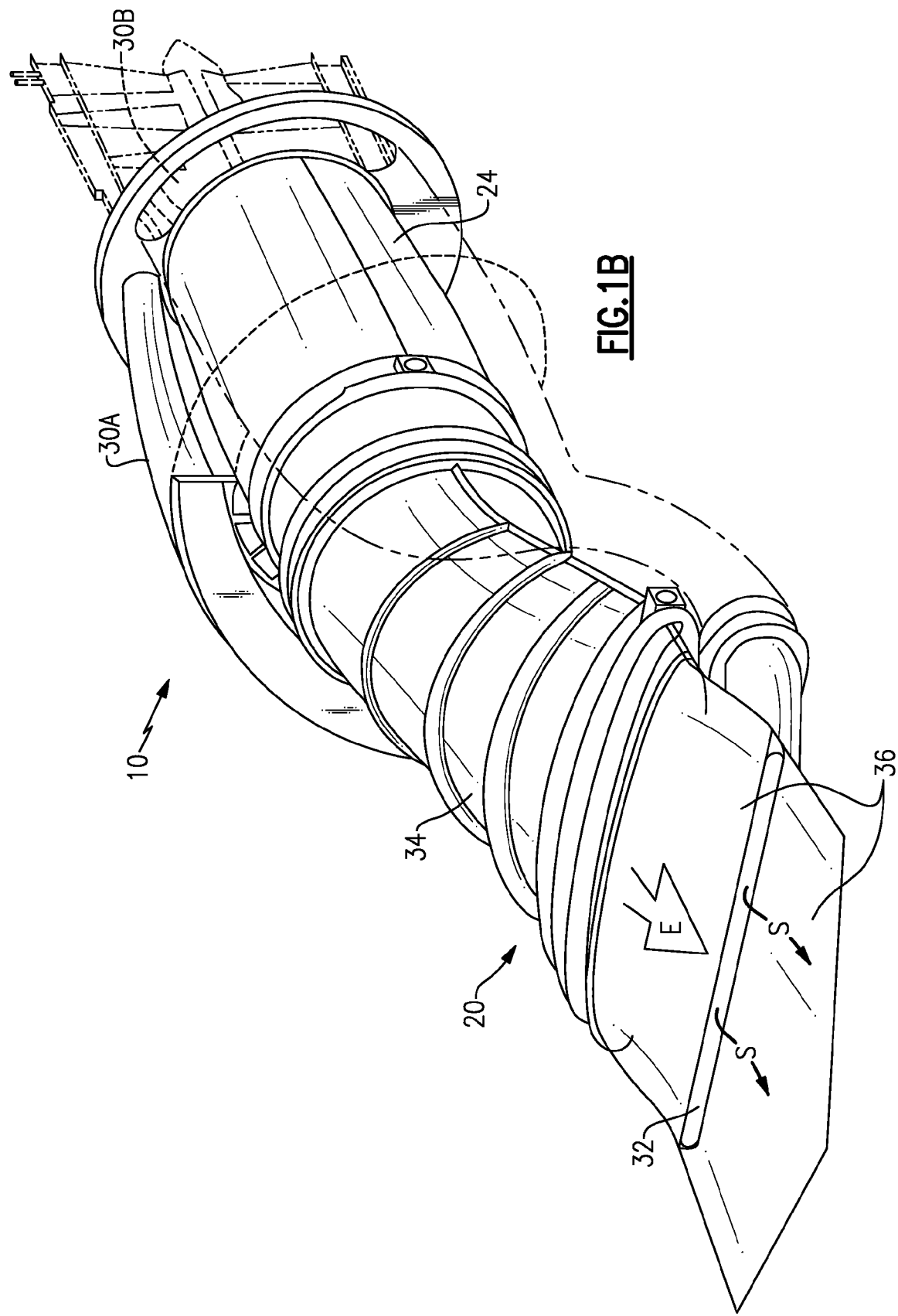
FIG. 1B is a perspective view of the gas turbine engine shown in FIG. 1A.

FIG. 1A schematically illustrates a gas turbine engine 10 which generally includes at least a fan section 12, a compressor section 14, a combustor section 16, a turbine section 18, an augmenter section 19, and a nozzle section 20. The compressor section 14, combustor section 16, and turbine section 18 are generally referred to as the core engine. An axis of the engine A extends longitudinally through these sections. It should be understood that the engine 10 may include alternative and additional sections.

An engine duct structure 22 and an inner structure 24 define an at least partially annular tertiary flow path 26 at least partially around a perimeter of a primary and secondary flow path 28 and 12 which directs a primary combustion core gas mixed with secondary cooling gas to create exhaust flow (illustrated schematically by arrow E). A portion of the primary flow may be diverted to provide a cooling fluid or flow C (secondary flow) provided between an interior structure 25 and the inner structure 24. It should be understood that the engine duct structure 22 may also at least partially define various airflow paths other than the disclosed tertiary flow path 26.

The tertiary flow path 26 guides a tertiary airflow S between the engine duct structure 22 and the inner structure 24. The tertiary airflow S is typically sourced from the fan section 12. The tertiary airflow S is utilized for a multiple of purposes including, for example, cooling, pressurization, and mixing with the core gas exhaust flow E after discharge through an exit 37 of the nozzle section 20 during particular operational profiles. The tertiary airflow S as defined herein is any airflow different from the primary combustion core gas and different from the secondary cooling gas that combine to create exhaust flow E such that a variable cycle third stream fan flow and auxiliary third flow stream deployed, for example, by opening a set of vanes 29 located in the tertiary flow path 26 surrounding the core engine may be considered a tertiary airflow S as defined herein.

Referring to FIGS. 1A and 1B, the nozzle section 20 generally includes a tertiary flow duct 30 with a generally planar secondary nozzle 32 and a primary flow duct 34 with a generally planar primary nozzle 36. The tertiary flow duct 30 communicates the tertiary airflow S therethrough and the primary flow duct 34 communicates primary combustion core gas exhaust flow E therethrough. The tertiary flow duct 30 in one embodiment is a bifurcated duct arrangement 30A, 30B which join at the secondary nozzle 32. The primary flow duct 34 is generally circular in cross-section at an upstream segment and transitions into the planar primary nozzle 36 at an aft end segment. The secondary nozzle 32 and the primary nozzle 36 in the disclosed embodiment include a straight shaped trailing edge, however, it should be understood that any other configuration may alternatively be utilized.

Referring to FIGS. 2 and 3, a first structure 40 is movable relative to a second structure 38, which may be a static structure such as a static liner of the primary flow duct 34. In the example, the movable structure 40 includes a liner surface 41 having cooling openings 42. A seal 44 is arranged between the static structure 38 and the liner surface 41 to provide a sealed first cavity 46 within the movable structure 40 relative to the exit 37.

An actuator 50 is operatively connected to the movable structure 40 to move the movable structure between a first position (retracted, FIG. 3) and a second position (extended, FIG. 2) and any position there between. A controller 51 is in communication with the actuator 50 to command the actuator 50 to translate the movable structure 40 between the first and second positions. In the example, the liner surface 41 is shielded behind the static structure 38, when retracted. In the extended position, the liner surface 41 may be exposed to the exhaust flow E approximately 95%.

A cooling fluid source 52, such as the secondary flow duct between 24 and 25, provides the cooling flow C to a second cavity 48. A valve 54 selectively provides fluid from the second cavity 48 to the first cavity 46 based upon the position of the movable structure 60 so that cooling flow C is conserved. That is, the movement of the actuator 50 also controls the rate of fluid flow through the valve 54 to the first cavity 46. A separate actuator is not needed to control the valve 54, and the valve 54 is operated in concert with the movement of the movable structure 40.

The cooling flow C within the first cavity 46 exits through the cooling openings 42 to provide a cooling boundary layer on the liner surface 41. As can be appreciated, the more the movable structure 40 is extended, the more cooling flow is needed to provide a sufficient cooling boundary layer on the liner surface 41.

Figure 4:
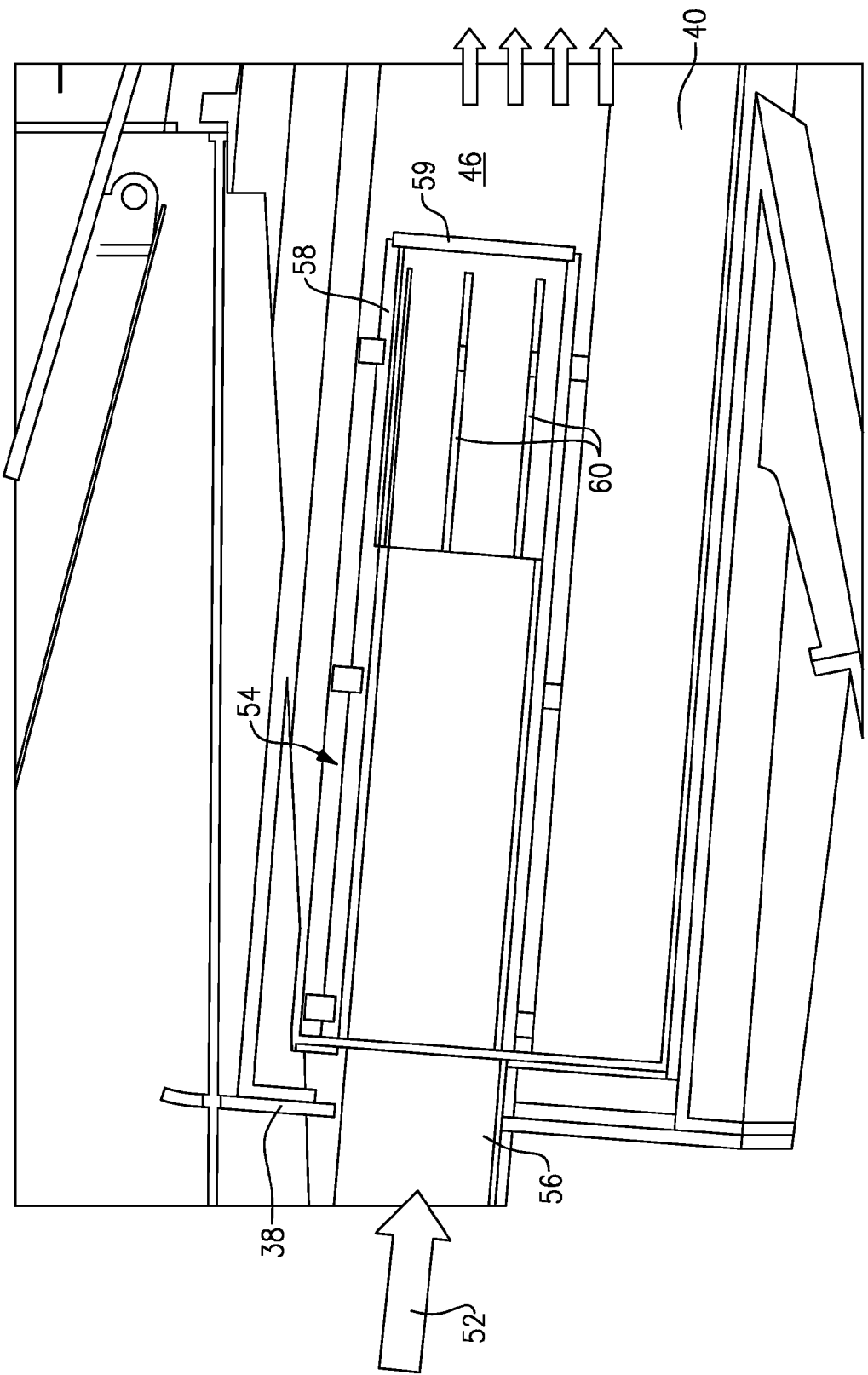
FIG. 4 is an enlarged view of an example valve used for selectively cooling the translating structure.

Referring to FIGS. 2-4, the example valve 54 includes first and second tubes 56, 58 that are nested relative to one another. In the example, the first and second tubes, 56, 58 are telescopically received relative to one another and translate relative to one another in response to movement of the movable structure 40. The second tube 58 includes an end wall 59. The first tube 56 receives cooling flow C from the second cavity 48, which is provided by the cooling fluid source 52.

The second tube 58 includes cooling apertures 60, which may be slots or one or more openings of any desired shape or size. The cooling aperture 60 are selectively obstructed or unobstructed depending upon the relative position of the first and second tubes 56, 58. As shown in FIGS. 2 and 3, with the movable structure 40 extended, the cooling apertures 60 are exposed, which permits cooling fluid to pass through the valve 54 into the first cavity 46 at a flow rate corresponding to the position of the movable structure 40. That is, the more the movable structure 40 is extended, the more that the cooling apertures 60 are exposed, thereby permitting an increased flow rate of cooling fluid into the first cavity 46. Conversely, the cooling aperture 60 are blocked with the movable structure 40 retracted. In one example, with the movable structure 40 in the fully retracted position as illustrated in FIG. 3, the fluid flow is cut off to the first cavity 46 since it is no longer needed to cool the liner surface 41, which is unexposed to the exit 37.

Although an example embodiment has been disclosed, a worker of ordinary skill in this art would recognize that certain modifications would come within the scope of the claims. For that reason, the following claims should be studied to determine their true scope and content.

What is claimed is:

1. A cooling system for a gas turbine engine comprising:
   a first structure movable relative to a second structure, the first structure having a cavity;
   a valve selectively controlling fluid flow from a cooling source to the cavity, the valve configured to move between first and second fluid flow positions in response to movement of the first structure, the first fluid flow position providing a greater amount of a cooling fluid from the cooling source to the cavity than in the second fluid flow position; and
   a nozzle having an exit and including a movable liner and a static liner respectively corresponding to the first and second structures, the movable liner including cooling openings in fluid communication with the cavity.

2. The cooling system according to claim 1, comprising an augmenter adjoining the nozzle and upstream from the static liner.

3. The cooling system according to claim 2, comprising a core engine and a cooling duct surrounding at least a portion of the core engine, the cooling duct providing the cooling source.

4. The cooling system according to claim 3, wherein the core engine provides a primary duct terminating in a primary nozzle provided by the nozzle, and comprising a secondary duct terminating in a secondary nozzle that adjoins the primary nozzle, the movable liner positioned at the secondary nozzle and configured to selectively obstruct the secondary nozzle with the valve moving between the first and second fluid flow positions.

5. The cooling system according to claim 1, wherein the movable liner includes an exterior surface facing the exit, the exterior surface configured to be exposed an amount generally proportional to the flow of cooling fluid from the valve when moving between the first and second fluid flow positions.

6. The cooling system according to claim 5, comprising an actuator operatively connected to the movable liner and configured to translate the movable liner in response to a command.

\* \* \* \* \*